(12) United States Patent
Frazier et al.

(10) Patent No.: US 7,577,908 B2
(45) Date of Patent: Aug. 18, 2009

(54) TV-CENTRIC SYSTEM

(75) Inventors: Milton Massey Frazier, San Marcos, CA (US); Behram Mario DaCosta, San Diego, CA (US); Robert Hardacker, Escondido, CA (US); Ian Charles Matthews, Escondido, CA (US); Djung Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 317 days.

(21) Appl. No.: 11/601,973

(22) Filed: Nov. 20, 2006

(65) Prior Publication Data

US 2008/0120683 A1 May 22, 2008

(51) Int. Cl.
*G06F 3/00* (2006.01)
(52) U.S. Cl. .................. 715/736; 715/735; 715/810; 709/224
(58) Field of Classification Search .............. 715/736, 715/735, 810; 709/224
See application file for complete search history.

(56) References Cited

U.S. PATENT DOCUMENTS

| | | | | |
|---|---|---|---|---|
| 5,539,815 A | * | 7/1996 | Samba | 379/221.07 |
| 5,870,564 A | * | 2/1999 | Jensen et al. | 709/241 |
| 6,028,589 A | * | 2/2000 | Mehra et al. | 345/603 |
| 6,363,434 B1 | | 3/2002 | Eytchison | 709/313 |
| 6,424,624 B1 | * | 7/2002 | Galand et al. | 370/231 |
| 6,577,327 B1 | * | 6/2003 | Rochford et al. | 715/735 |
| 6,853,388 B2 | * | 2/2005 | Ueno et al. | 715/736 |
| 6,931,442 B1 | * | 8/2005 | Hamanaka | 709/224 |
| 7,020,086 B2 | * | 3/2006 | Juttner et al. | 370/238 |
| 7,032,126 B2 | * | 4/2006 | Zalewski et al. | 714/7 |
| 2002/0026636 A1 | | 2/2002 | Le Comte | |
| 2003/0014548 A1 | | 1/2003 | Valentine et al. | |
| 2004/0117788 A1 | | 6/2004 | Karaoguz et al. | |
| 2004/0133657 A1 | | 7/2004 | Smith et al. | |
| 2004/0177371 A1 | | 9/2004 | Caspi et al. | |
| 2004/0250039 A1 | | 12/2004 | Hanks | |
| 2004/0268407 A1 | | 12/2004 | Sparrell et al. | 725/116 |
| 2005/0018697 A1 | | 1/2005 | Enns et al. | 370/401 |
| 2008/0086343 A1 | * | 4/2008 | Pendergraft et al. | 705/7 |
| 2008/0120682 A1 | | 5/2008 | Hardacker | |

FOREIGN PATENT DOCUMENTS

| JP | 22312225 A2 | 4/2001 |
|---|---|---|
| WO | 2005/067282 | 7/2005 |

OTHER PUBLICATIONS

Passler AG, The Network Monitoring Company, "PRTG traffic Grapher", 1998-2006 website printout www.passler.com.prtg.
Locktime Software s.r.o., "NetLimiter 2 Pro", 2003-2006 website printout http://www.netlimiter.com/.
Hardacker, "TV-Centric System", File History for U.S. Appl. No. 11/601,331, filed Nov. 17, 2006.

* cited by examiner

*Primary Examiner*—Tadesse Hailu
*Assistant Examiner*—Michael Roswell
(74) *Attorney, Agent, or Firm*—John L. Rogitz

(57) ABSTRACT

Home network resources and communication paths are managed using network path bandwidths, network storage capacities, and quality of service.

19 Claims, 5 Drawing Sheets

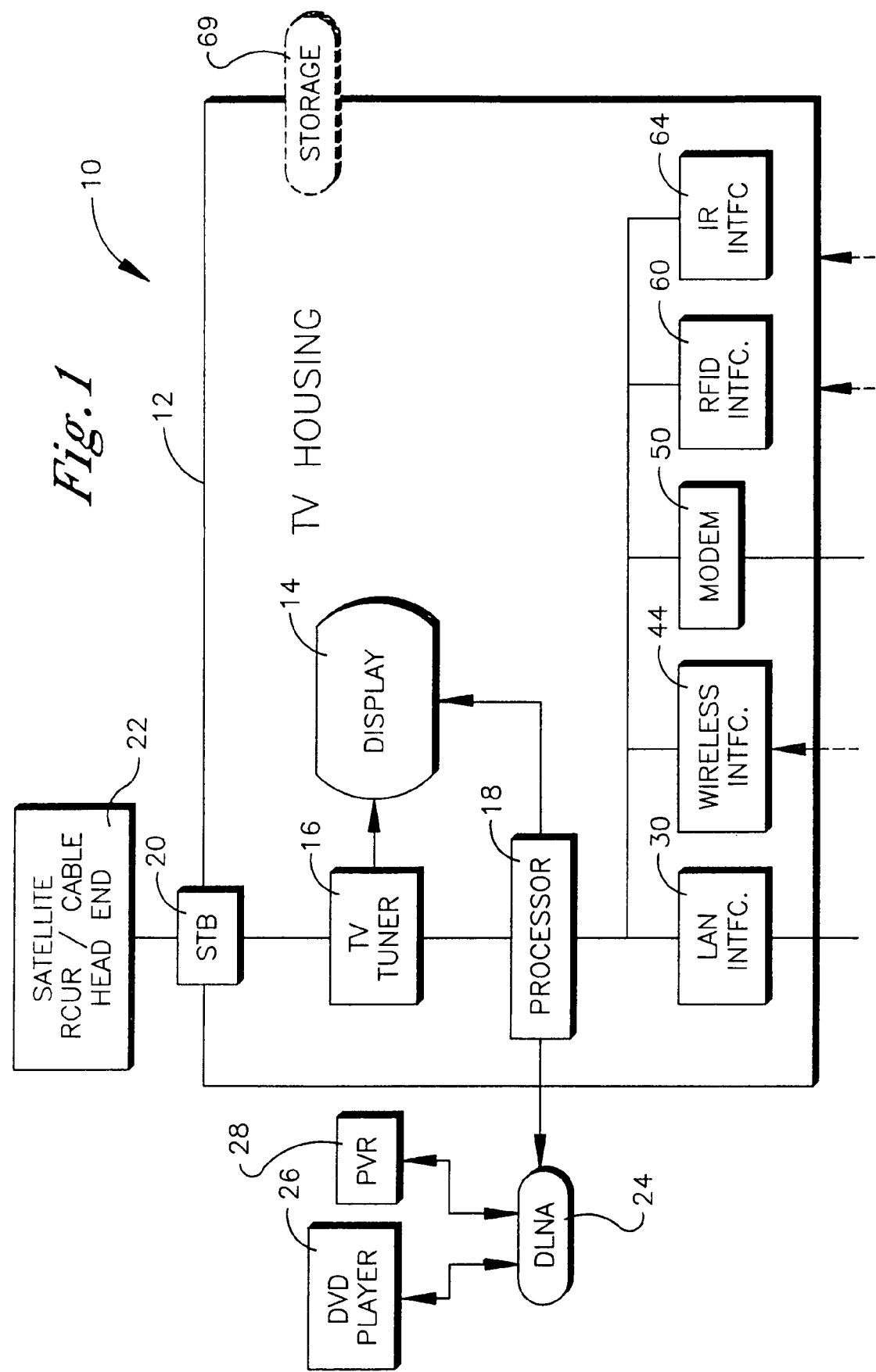

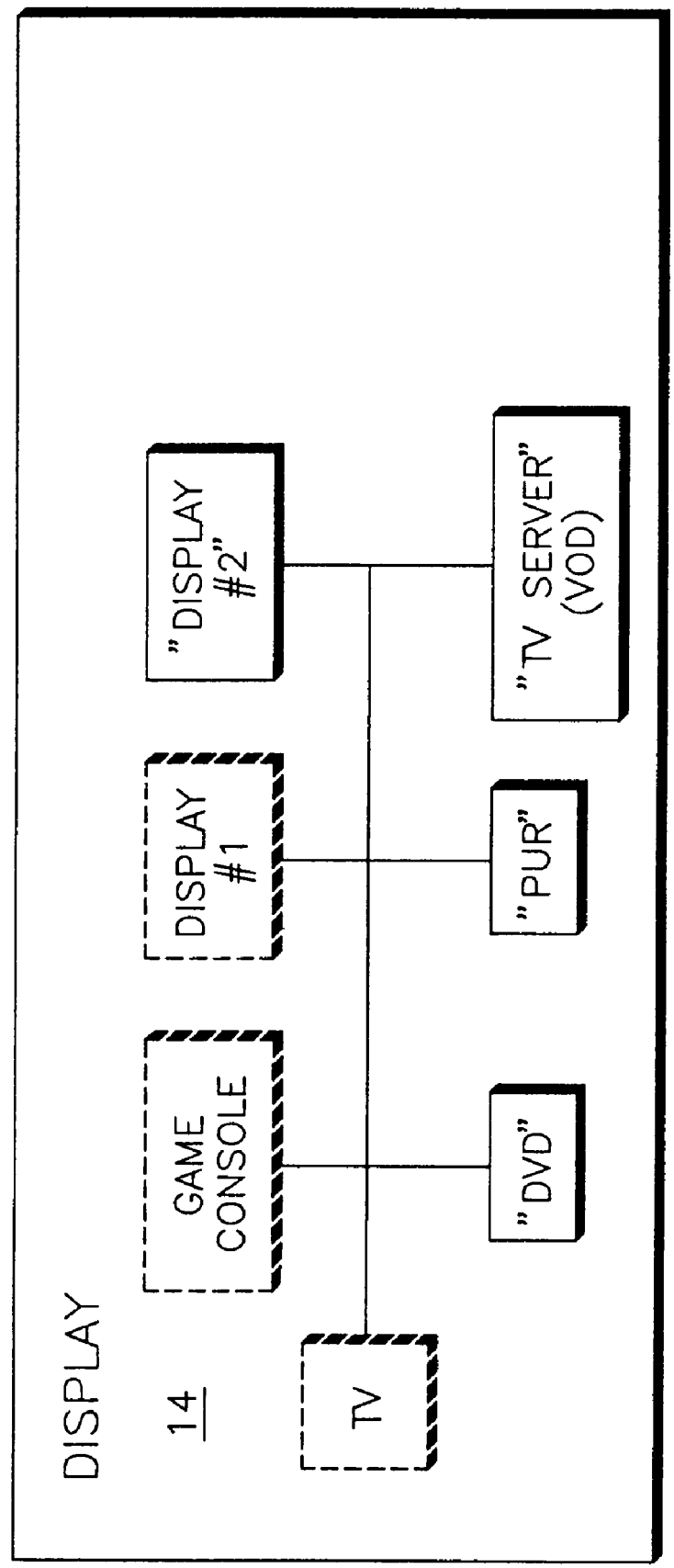

TV-CENTRIC SYSTEM

FIELD OF THE INVENTION

The present invention relates generally to TV-centric home entertainments systems.

BACKGROUND OF THE INVENTION

Home networks including TVs that may communicate with various devices such as disk players, digital video recorders (DVR), personal computers, and the like can be difficult for non-technical users to set up and manage. Indeed, even technical users often encounter frustration in setting up and managing home networks.

Among the difficulties in managing home networks is that of resource management. For example, it might happen that a movie a user wishes to view on his TV is available on both a DVD player and a DVR, but the user typically has no way of knowing which device would be optimum to use from a bandwidth standpoint. Indeed, bandwidth considerations can change over time, as playing a movie from the DVD player might at one point in time result in the most optimum network bandwidth allocation while at a later point in time the optimum bandwidth allocation might be achieved by playing the same movie from the DVR.

Moreover, as intimated by the discussion above, it can happen that the network contains more than one storage device, and that duplicate copies if the same piece of content might be stored on more than one device. This might be desirable in some cases and undesirable in others, but regardless, users typically have little or no tools to help them manage home entertainment network storage. With the above critical recognitions in mind, the invention herein is provided.

SUMMARY OF THE INVENTION

In a home network including at least one TV with TV processor and at least first and second sources of audio/video communicating with the TV over respective first and second paths, a method is provided that includes using bandwidth information about each path and/or using QoS information about each path, outputting an optimum one of the paths.

In non-limiting implementations the network may also include at least two storage sinks, and the method can include using storage capacity information about each sink to indicate an optimum one of the sinks. The TV can display a map to execute the indicating step, or the TV, in response to user input to play audio/video that is available on both sources, can automatically select the source associated with the optimum path. The user may be permitted to select a path/sink on the map.

In another aspect, a system has a TV displaying a network map representing a home network, and a user input device manipulable to navigate the map and to select icons on the map representing components in the system for a user-desired task. The map can change the appearance of at least one icon and/or path between icons to provide visible indication of advantageous component and/or path selection for executing the task.

One component can be a personal computer communicating with non-audio/video peripherals in a computer network. The TV communicates with at least one audio/video component in a TV network, and the computer network and TV network can be physically implemented using at least one common communication path. In this non-limiting embodiment, a common communication protocol can be used between the TV and PC, in which case the TV can be given arbiter rights to manage bandwidth for audio/video data transmissions in the TV network and the PC can be given arbiter rights to manage bandwidth for non-audio/video data transmissions in the computer network.

In yet another aspect, a TV processor associated with a TV can have code means for comparing first and second bandwidths and/or first and second quality of service (QoS) indications of respective first and second communication paths in a home network. The processor can also have code means for outputting an optimum path based on the means for comparing.

The details of the present invention, both as to its structure and operation, can best be understood in reference to the accompanying drawings, in which like reference numerals refer to like parts, and in which:

BRIEF DESCRIPTION OF THE DRAWINGS

FIGS. 2-4 are screen shots showing non-limiting network maps that can be displayed on the TV.

DETAILED DESCRIPTION OF THE PREFERRED EMBODIMENT

Figure 1:
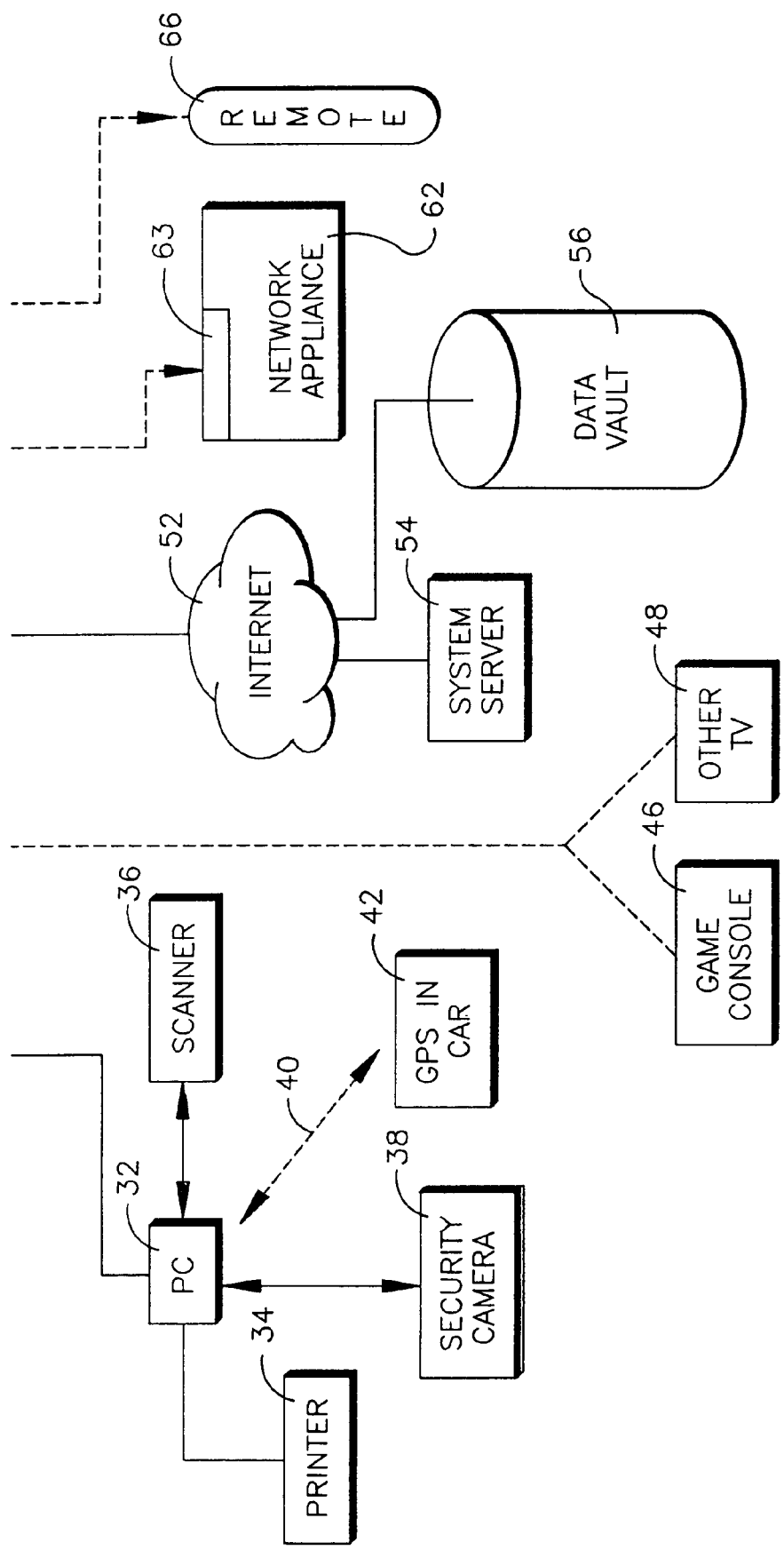
FIG. 1 is a block diagram of a non-limiting TV-centric system in accordance with the invention.

Referring initially to FIG. 1, a non-limiting home entertainment system is shown, generally designated 10, which includes a TV housing 12 holding TV components including a TV display 14, a TV tuner 16, and a TV processor 18. The TV tuner 16 may receive input from a set-top box (STB) 20 that, as indicated in FIG. 1, can be part of the housing 12 or alternatively can be in a housing separate from the housing 12. In any case, the STB 20 receives TV signals from one or more sources 22 such as but not limited to satellite receivers, cable system head ends, broadcast receiver antennae, etc. Depending on the nature of the signal, it may be sent directly to the display 14 from the tuner 16 or sent first through the processor 18 for subsequent display. It is to be understood that the tuner 16 may be in the STB 20 to output signals to the TV in analog format (e.g., CVBS, Y/C, or RGB) and/or digital format (e.g., DVI, HDMI, IEEE 1394 (referred to as iLink), USB, or some other appropriate format.)

The non-limiting embodiment shown in FIG. 1 illustrates that the present TV can be connected to a plurality of external systems and networks, it being understood that in some implementations not all the components shown in FIG. 1 need be used. In essence FIG. 1 shows a comprehensive TV-centric system for completeness.

In one embodiment, the TV processor 18 may communicate with a digital living network association (DLNA) system 24. Also connected to the DLNA system 24 can be various components including but not limited to a disk player such as a DVD player 26 or Blu-Ray disk player and a digital video recorder (DVR, also known as a personal video recorder (PVR)) 28. Information including multimedia streams such as TV programs and movies can be exchanged between the TV processor 18 and the DVD player 26 and PVR 28 in accordance with DLNA principles known in the art.

Plural LAN interfaces may be included in the TV to provide both wired and wireless interfaces. These may take the form of an Ethernet across the various physical interfaces such as but not limited to IEEE 802.3 wired, IEEE 802.11x wireless, or virtual Ethernet across coaxial cable or across the home's AC power line connection.

Accordingly, a wired local area network (LAN) interface 30 may be provided in the TV housing 12 and connected to the TV processor 18, so that the TV processor 18 can communicate with components on a wire LAN, implemented in some embodiments as an Ethernet. These components may include a personal computer 32 or other computer, and the computer 32 can communicate with computer network peripheral equipment such as but not limited to a printer 34, a scanner 36, and a security camera 38. All or parts of the computer network may overlap with the various networks with which the TV processor 18 communicates as discussed more fully below.

In addition to Ethernet links, the LAN may include one or more wireless links 40, so that the PC 32 (and, hence, the TV processor 18) may communicate with wireless components such as a vehicle-mounted global position satellite (GPS) receiver 42. Without limitation, the wireless link 40, like other wireless links herein, may be, e.g., an 802.11 link, a Wi-Fi link, a Bluetooth link, an IR link, an ultrasonic link, etc.

In some implementations, a pre-existing LAN might exist in the form of twisted pair wiring, coaxial wiring, power line, etc. in a house, and it might be desired to use the pre-existing LAN for the TV components to establish a shared network. In such a case, the physical media is shared between the PC 32 and TV processor 18 with associated components. In one embodiment, the TV components can use a first protocol such as a proprietary protocol while the PC 32 and associated peripherals can use a different, second protocol, so that communication interference is avoided. Alternatively, if a common protocol is used, undesirable devices from the TV standpoint (such as, e.g., the printer 34 and scanner 36) can be removed from the TV network so that, for example, they do not appear on the below-described TV network maps.

When the same protocol is used between the TV processor 18 and the PC 32, the TV processor 18 can be given arbiter rights to manage bandwidth for audio/video data transmissions in the network, and the PC 32 can be given arbiter rights to manage bandwidth for non-audio/video data transmissions. Also, the TV processor 18 may "see" the PC 32 in the TV network but this does not mean that the PC 32 necessarily recognizes the TV components to be part of its network. A router hub may be used in the case of a IEEE 802.3 LAN to accommodate various network devices and enable both wired and wireless devices to communicate at a common point, i.e., a wireless access point communicates wirelessly to various devices and via 10/100BaeT bridged through the router hub to the wired devices. This hub in effect is represented inside the TV housing 12 along the bottom.

Apart from the wireless link 40 of the LAN with which the TV processor 18 may communicate, a wireless communication interface 44 may be in the TV housing 12 and may communicate with the TV processor 18 as shown. The wireless communication interface may wirelessly communicate with various components such as but not limited to a video game console 46, such as a Sony Playstation®, and another TV 48 that might be located in, e.g., another room.

The processor 18 may also communicate with a computer modem 50 in the TV housing 12 as shown. The modem 50 may be connected to the Internet 52, so that the TV processor 18 can communicate with a web-based system server 54 and a web-based data vault 56.

In addition to the wireless communication interface 44 and the modem 50, the TV processor 18 may communicate with a radiofrequency identifier (RFID) interface 60 in the housing 12 or attached thereto using, e.g., a uniform serial bus (USB) cable, to facilitate communication in accordance with RFID principles known in the art between the TV processor 18 and an RFID-enabled network appliance 62 having an RFID device 63 mounted on it or connected to it. Furthermore, the TV processor 18 can, through an infrared interface 64, receive user commands from a remote control device 66 that transmits IR signals, it being understood that the remote control device 66 may alternately use RF, in which case the interface 64 would be an RF interface.

FIG. 1 also shows that the TV can have a data storage 69. The storage 69 may be flash or ROM or RAM in the TV and/or it may be a removable memory device such as a Sony Memory Stick®.

Figure 2:
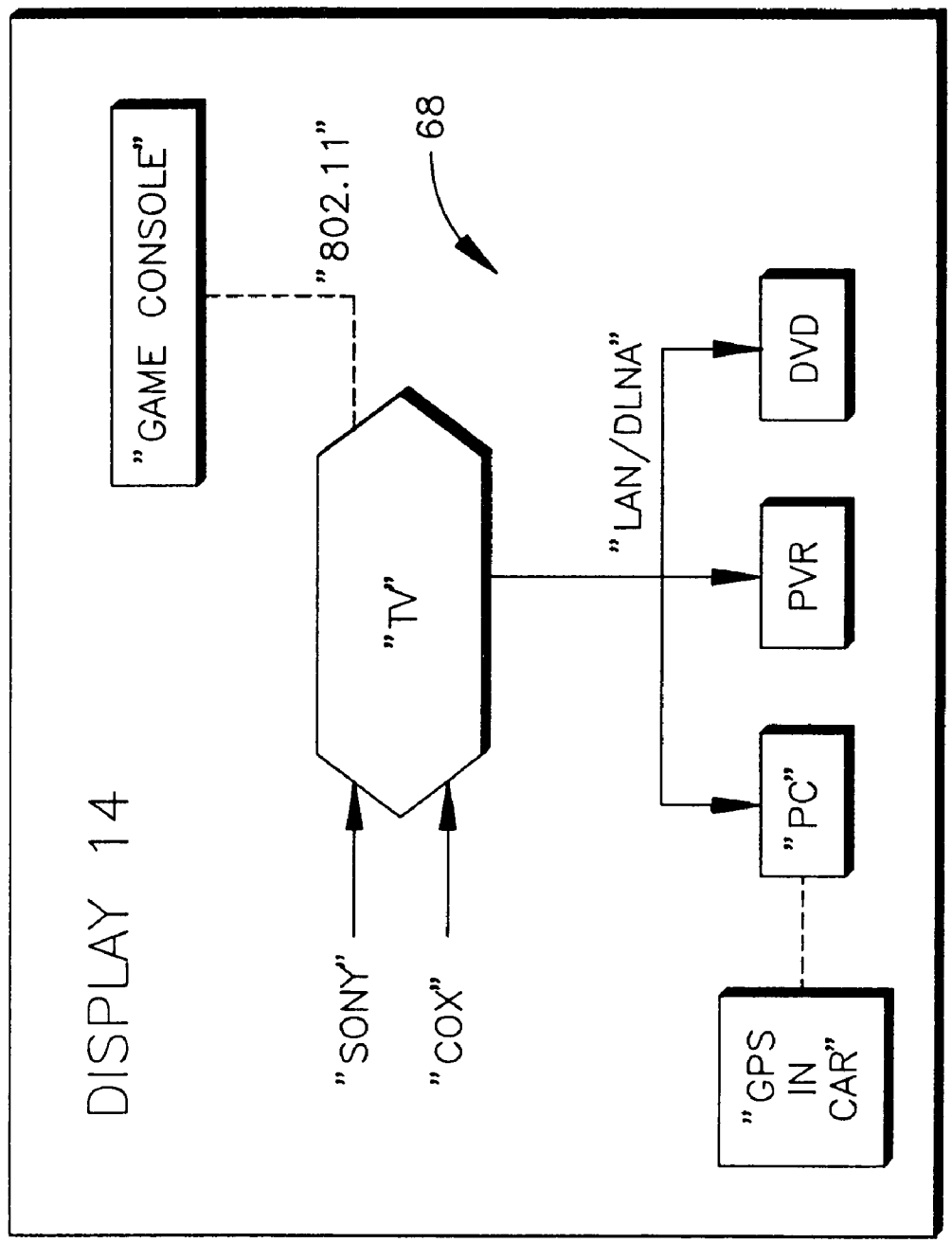

Among the recognitions made herein, it may happen that in some implementations, the TV shown above may not have a hard disk drive (HDD) and/or the PVR 28 may not be available or the correct digital rights management information may be unavailable for recording a program to disk. Accordingly, as shown in FIG. 2 the TV processor 18 may cause to be presented on the TV display 14 a topography map, generally designated 68, that is essentially a user interface that a user can operate on by means of the remote control device 66 to map a HDD in the PC 32 to the TV to thereby allow the user to load content received by the TV onto the PC HDD for later reliable streaming. The PC 32 may also transcode multimedia streams from a codec that might be incompatible with the TV to another, compatible codec. Note that the map 68 shown in FIG. 2 need not show all of the components illustrated in FIG. 1, but can illustrate some or all of the components in the system as desired for simplification. Content stored on the HDD of the PC 32 may later be played back on the TV display 14. Also, content from non-TV sources, e.g., from the DVD player 26, may be sent to the PC 32 HDD for storage.

To operate the UI that is represented by the map 68, a user can manipulate buttons on the remote control device 66 to navigate around the map, clicking on a component with a button designating the component as a "source" and then moving the cursor over the desired "sink" component (in the case shown, the PC) and clicking on a "sink" button to indicate that recording from the source to the sink is to be undertaken. This is but one non-limiting example of how the map 68 can be used to send content from the TV and/or DVD player 26 to the home PC 32.

The map 68 can be created by the TV processor 18 automatically, upon initial connection and perhaps also on every subsequent energization, "discovering" networked devices in accordance with network discovery principles known in the art. Or, a user may be permitted to manually input data to construct the map 68 using the remote control device 66.

Figure 3:
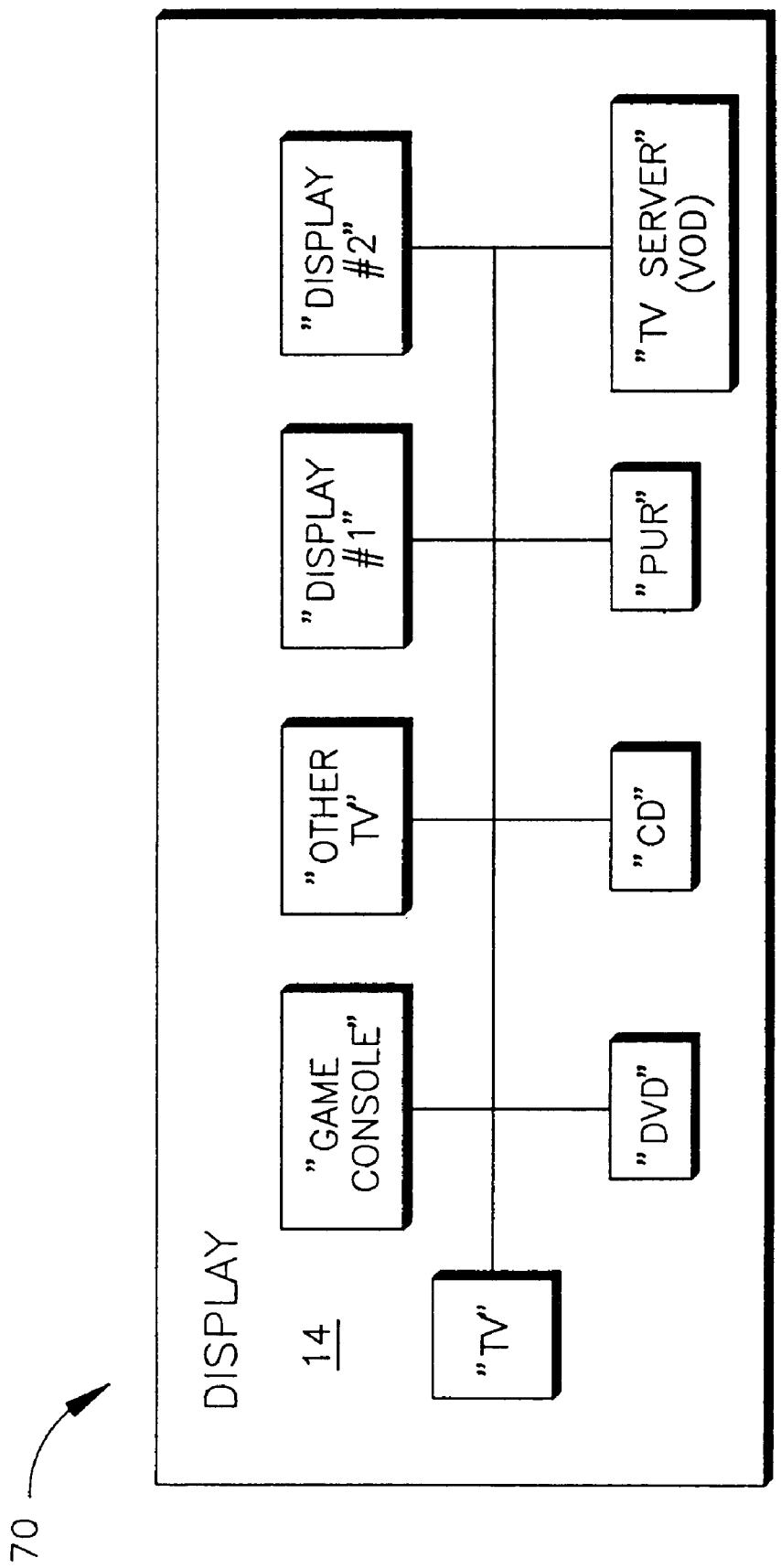

FIG. 3 shows a screen shot that can be presented on the display 14 to provide a network map 70 that can be used as a user interface for determining an optimum path for a desired function. With more specificity, using the map 70, a user can select a source and sink device for, e.g., playing a multimedia stream and then be presented with information pertaining to a "best" arrangement that can depend on bandwidth considerations, quality of service (QoS) considerations, and device capabilities.

To illustrate, assume the following hypothetical. A user can move the cursor over each icon shown in FIG. 3 to cause a drop-down menu to appear, showing the capabilities of that device. Assume that it is the user's intentions to find and play "movie A", and that when the cursor is over the DVD icon, the PVR icon, and the TV internet server icon, a menu appears indicating that "movie A" is stored on the associated component. When the cursor is over the display and TV icons, assume that a menu appears indicating the capabilities of the display, e.g., "HD" or "SD".

Should the user input "movie A", the display in FIG. 4 can appear, in which, depending on determinations made by the TV processor 18, some icons representing components that are completely unsuitable for sourcing "movie A" given its format (such as the CD icon) or playing "movie A" given its format (such as the "other TV" icon) are removed from the map 70 entirely while other icons representing components that can source or play, albeit suboptimally, "movie A" (such as the "game console" icon and "display 1" icon) are lowlighted. In lieu of or in addition to icon lowlighting or removal, path lines between icons can be lowlighted or removed.

Thus, only icons (and/or path lines) representing components that can adequately source or play the selection remain on, and a "best" path may be highlighted, e.g., all three source icons (DVD, PVR, and TV server) shown in FIG. 4 remain on, only a single sink icon ("display 2") remains on, and if bandwidth considerations or quality of service considerations or storage space considerations or other operational considerations indicate that streaming "movie A" from the DVD to the display 2 is the optimum path, that path can be highlighted. In this way, the user knows what the optimal source/sink arrangement is for the desired stream.

In determining a best path based on bandwidth considerations, the following non-limiting heuristics can be used. The bandwidth required for streaming a movie in the format selected (e.g., HD) is compared to the measured or estimated bandwidths that are available between the TV and each potential source as measured or estimated during initial power-on or periodically by the TV and/or source. Sources communicating with the TV over paths with insufficient bandwidth are eliminated. If two or more sources communicate with the TV over paths that have sufficient bandwidth, the "best" source can be determined to be the one that can source the movie with the least impact on the remainder of the network. For example, if a DVD player shares part of the same physical network as a PC and the PC is turned on, indicating that streaming from the DVD player could reduce PC network bandwidth, then an alternate source such as the PVR (assuming it has sufficient bandwidth) may be selected. All of these determinations may be made by, e.g., the TV processor transparently to the user.

Likewise, QoS can be used to determine the best path. If the difference in QoS between two paths exceeds a threshold, for instance, the path having the best QoS can be selected; otherwise (i.e., if QoS is about equal), the path with the greatest bandwidth is indicated as being optimal. Or, QoS may be a subsidiary consideration to use, if, for example, bandwidth is primary and two paths are found to have approximately equal bandwidths. In this case, the path having the best QoS can be indicated as being "best". Some combination of bandwidth and QoS might always be used by weighting both bandwidth and QoS from each available path and combining them, and then indicating as the optimal path the one with the "best" combination.

Similar heuristics can be applied in reverse, i.e., for storing content in the network, by determining remaining storage capacity in the various storage devices, whether a particular device stores data from more than one source or is dedicated to a single source, etc. As an example, if a TV show is to be recorded and both the HDD of the PC and the PVR are available, if both devices have approximately the same remaining capacity as reported to, e.g., the TV, storage on the PVR might be indicated as being optimal in that the PVR usually is dedicated to the TV while the PC HDD must also store data from the PC and other components. On the other hand, if the PVR is almost full and the PC HDD almost entirely free, storage on the PC HDD might be indicated as being optimal. This is but one non-limiting example of how a network processor such as a TV processor might use storage capacity information pulled from or pushed by network devices to indicate optimum storage sinks and thus aid the user in network management.

Thus, the TV processor 18, in conjunction with the above-described network maps, allows users to select optimum sources and sinks in the system 10 to display particular multimedia streams, and to prioritize and schedule more than one event. For instance, a user can undertake the above-described hypothetical selection of "movie A", store it to memory in the TV for playback at a scheduled future time, and then schedule another event (e.g., record "TV program B") for an overlapping period. The TV processor 18 in such as case could, in some implementations, recalculate the "movie A" arrangement in light of the desire to record "TV program B" to ensure that bandwidth, storage space, QoS, etc. remain optimized.

In undertaking the above, the TV processor 18 can discover the other components shown in FIG. 1 to generate one or more of the non-limiting network maps described above. The TV may "pull" storage capacity and bandwidth information from each component, or the components might automatically and periodically "push" this information to the TV.

In any case, when the TV is first taken out of the box by the user and turned on, the TV processor 18 can in some implementations automatically search for networks and other connections, e.g., Ethernets, DLNA networks, etc., obtain bandwidth/storage capacity/QoS/other network management information, and then inform the user as to what capabilities exist, showing, if desired, the map on the display 14. Appropriate configuration of the TV and network is then automatically executed, relieving the user of the sometimes confusing chore of "setting up" the home network.

Instead of indicating to the user the "best" path it is to be understood that the TV processor 18 may simply automatically select a source of audio/video having the optimal bandwidth/QoS and/or select the best storage sink having the optimal storage capacity.

While the particular TV-CENTRIC SYSTEM is herein shown and described in detail, it is to be understood that the subject matter which is encompassed by the present invention is limited only by the claims.

What is claimed is:

1. A system, comprising:
    a TV displaying a network map representing a home network, the map displaying available path lines between components of the network that are available to source or play a user selection, a first available path line appearing differently than a second available path line on the map to indicate a best path relative to the user selection; and
    a user input device manipulable to navigate the map and select icons on the map representing components in the system for a user-desired task, the map changing the appearance of at least one icon and/or path between icons to provide visible indication of advantageous component and/or path selection for executing the task.

2. The system of claim 1, wherein at least one component is a personal computer communicating with non-audio/video peripherals in a computer network, the TV communicates with at least one audio/video component in a TV network, and the computer network and TV network are physically implemented using at least one common communication path, and further wherein when a common communication protocol is used between the TV and PC, the TV is given arbiter rights to manage bandwidth for audio/video data transmissions in the TV network and the PC is given arbiter rights to manage bandwidth for non-audio/video data transmissions in the computer network.

3. The system of claim 1, wherein the map is configured to indicate an optimum path for a user-selectable communication for sending audio/video in the home network to the TV based at least in part on bandwidth.

4. The system of claim 1, wherein the map is configured to indicate an optimum path for a user-selectable communication for sending audio/video in the home network to the TV based at least in part on quality of service (QoS), wherein if the difference in QoS between two paths exceeds a threshold, the path having the best QoS is indicated as such on the map; otherwise, if QoS is about equal, the path with the greatest bandwidth is indicated on the map as being optimal.

5. The system of claim 1, wherein the map is configured to indicate an optimum sink component in the network for storing audio/video.

6. The system of claim 1, wherein network components communicate bandwidth information to each other.

7. The system of claim 1, wherein the map highlights a best path as determined by bandwidth and QoS, QoS being a consideration subsidiary to bandwidth such that bandwidth is used to indicate on the map an optimum path unless two paths are found to have approximately equal bandwidths, in which case a path having the best QoS is indicated on the map as being "best".

8. In a home network including at least one TV with TV processor, at least first and second sources of audio/video communicating with the TV over respective first and second paths, a method comprising:

using bandwidth information about each path and/or using QoS information about each path, outputting an optimum one of the paths, wherein if a user selects a piece of content, a first visual representation representing a component in the home network that is completely unsuitable for sourcing or playing the piece of content given the format of the piece of content, and/or a first path line to the first representation, are removed from or low-lighted on the TV, while a second visual representation representing a component that can source or play the piece of content suboptimally is displayed on the TV alone with a second path line thereto and a third visual representation representing a component that can optimally source or play the piece of content is displayed on the TV along with a third path line to the third representation, the third representations and/or third path line being highlighted on the TV relative to the second representation and/or second path line, respectively, such that only representations of components (and/or path lines thereto) representing components that can source or play the piece of content are presented visually in a manner indicating to a user what an optimal source/sink arrangement is for the piece of content.

9. The method of claim 8, wherein the network also includes at least two storage sinks, and the method includes using storage capacity information about each sink to indicate an optimum one of the sinks.

10. The method of claim 8, wherein the TV displays a map to execute the indicating step.

11. The method of claim 8, wherein the TV, in response to user input to play audio/video that is available on both sources, automatically selects the source associated with the optimum path.

12. A TV processor associated with a TV and comprising:
code means for comparing at least first and second bandwidths and/or first and second quality of service (QoS) indications of respective first and second communication paths in a home network; and
code means for outputting an optimum path based at least in part on the means for comparing, wherein
if first and second sources in the network communicate with a display device in the network over respective paths that have bandwidth sufficient for a selected niece of content, a "best" source is determined to be the first or second source that can provide the piece of content with the least impact on a remainder of the network, such that if the first source shares a physical network with a computer and the second source does not share the physical network with the computer and the computer is activated, then the second source is selected to provide the piece of content.

13. The processor of claim 12, wherein the processor causes the TV to display a map of the network indicating the optimum path.

14. The processor of claim 12, wherein the processor automatically selects the optimum path for a user.

15. The processor of claim 12, wherein the processor permits a user to select a path using the map.

16. The processor of claim 12, further comprising:
code means for comparing at least first and second storage capacities of respective first and second storage sinks in the home network; and
code means for outputting an optimum storage sink based at least in part on the means for comparing at least first and second storage capacities.

17. The processor of claim 16, wherein the processor causes the TV to display a map of the network indicating the optimum sink.

18. The processor of claim 16, wherein the processor automatically selects the optimum sink for a user.

19. The processor of claim 16, wherein the processor permits a user to select a sink using the map.

* * * * *